(12) United States Patent
Bazan et al.

(10) Patent No.: US 7,825,200 B2
(45) Date of Patent: Nov. 2, 2010

(54) CONTROLLED FREE RADICAL GRAFTING FROM POLYOLEFINS

(75) Inventors: Guillermo C. Bazan, Santa Barbara, CA (US); Robert C. Coffin, Santa Barbara, CA (US)

(73) Assignee: The Regents of the University of California, Oakland, CA (US)

(*) Notice: Subject to any disclaimer, the term of this patent is extended or adjusted under 35 U.S.C. 154(b) by 952 days.

(21) Appl. No.: 11/655,606

(22) Filed: Jan. 18, 2007

(65) Prior Publication Data

US 2007/0149732 A1 Jun. 28, 2007

Related U.S. Application Data

(63) Continuation-in-part of application No. 10/378,957, filed on Mar. 3, 2003, and a continuation-in-part of application No. 10/377,491, filed on Feb. 28, 2003, now Pat. No. 7,259,214.

(51) Int. Cl.
*C08F 4/80* (2006.01)
(52) U.S. Cl. .................. 526/117; 526/113; 526/118; 526/119; 526/161; 526/169.1; 526/171; 526/172; 526/281; 526/329; 525/245; 525/248
(58) Field of Classification Search .......... 525/245, 525/248; 526/113, 117, 118, 119, 161, 169.1, 526/171, 172, 281, 329
See application file for complete search history.

(56) References Cited

U.S. PATENT DOCUMENTS

| | | | |
|---|---|---|---|
| 4,024,149 | A | 5/1977 | Winters et al. |
| 5,281,368 | A | 1/1994 | Dias et al. |
| 5,919,916 | A | 7/1999 | Gracey et al. |
| 6,897,275 | B2 * | 5/2005 | Wang et al. .......... 526/161 |
| 2004/0171479 | A1 | 9/2004 | Bazan et al. |

FOREIGN PATENT DOCUMENTS

| | | | |
|---|---|---|---|
| WO | WO 98/42664 | * | 10/1998 |
| WO | WO 01/92348 | * | 12/2001 |

OTHER PUBLICATIONS

Tomov et al., Journal of Molecular Catalysis A: Chemical 103 (1995) 95-103.*
Baumert et al., Macromol. Rapid Commun. 21 (2000) 271-276.*
Chung, T.C. *Prog. Polym. Sci.* 2002, 27, 39.
Yasuda, H.; Ihara, E.; Morimoto, M.; Yamashita, M.; Nodono, M.; Yoshioka, S. *Polymer Preprints* 1994, 35, 532.
Ned B. Bowden et al, Macromolecules 2002, 35m 9246-9248.
Lee, B. Y.; Bazan, G. C.; Vela, J.; Komon, Z. J. A.; Bu, X. *J. Am. Chem. Soc.* 2001, 123, 5352.
Schunn, R. A.; Ittel, S. D.; Cushing, M. A. Inorg. Synth. 1990, 28, 94.
Bothe, M.; Schmidt-Naake, G. *Macromol. Rapid Commun.* 2003, 24, 609.
Ittel, S. D.; Johnson, L. K.; Brookhart, M. *Chem. Rev.* 2000, 100, 1169.

* cited by examiner

*Primary Examiner*—Roberto Rabago
(74) *Attorney, Agent, or Firm*—Berliner & Associates

(57) ABSTRACT

Described are novel monomers bearing functionalities capable of initiating control free radical reactions, and a novel process using these initiating monomers in the co-polymerization of an olefin for the formation of well-controlled polyethylene graft polymers where the graft component is derived from controlled free radical polymerization reactions. The initiating monomers are produced by combining an amount of 5-norbornen-2-ol with a hydride or amine for a predetermined amount of time to form a mixture; and adding an amount of an alkyl or acyl halide to said mixture. Polymerization of an olefin with an initiating monomer is conducted in the presence of a metal compound, where the metal compound is comprised of a Group VIII transition metal complex.

8 Claims, 4 Drawing Sheets

CONTROLLED FREE RADICAL GRAFTING FROM POLYOLEFINS

CROSS-REFERENCE TO RELATED APPLICATIONS

This application is a continuation-in-part of U.S. patent application Ser. No. 10/377,491, filed on Feb. 28, 2003 now U.S. Pat. No. 7,259,214 and U.S. patent application Ser. No. 10/378,957, filed on Mar. 3, 2003, both of which are incorporated in their entirety by reference herein.

FIELD OF INVENTION

This invention relates generally to co-polymerization of olefins with functionalized monomers; more particularly to the design and synthesis of substituted olefins functionalized with free radical initiators, copolymerization with ethylene and subsequent grafting of commodity monomers from the resultant ethylene copolymers via controlled free radical polymerization.

BACKGROUND OF THE INVENTION

It is of interest to incorporate polar functionalities into polyolefin materials in a controlled manner, unfortunately most polyolefin initiator systems are sensitive to polar groups and as such are deactivated in the presence of functionalized comonomers [1]. Recent advances in polyolefin catalysis have improved functional tolerance, however, few catalysts are able to incorporate large amounts of functionalized comonomer [2, 3] and even fewer can incorporate inexpensive functionalized commodity monomers via a polymerization reaction that can be used to create higher order polymer architectures, such as block-copolymers, tapered copolymers and tetrablock copolymers [4].

BRIEF SUMMARY OF THE INVENTION

The present invention fulfills the need for high incorporation of functionality in polyolefin materials using commercially relevant monomers. In the case when a quasi-living metal mediated copolymerization is used, the control afforded by this and the living free radical technique allow for access to a wide range of polymer architectures that bear predominantly polyethylene backbones with grafted side chains of functionalized commodity monomer.

In one embodiment, a process for producing an initiating monomer is disclosed comprising combining an amount of 5-norbornen-2-ol with an hydride or amine for a predetermined amount of time to form a mixture; and adding an amount of an alkyl or acyl halide to said mixture.

In a more particular embodiment, a process for producing an initiating monomer is disclosed where an amount of 5-norbornen-2-ol is combined with potassium hydride, or triethylamine; and adding an amount of an halide selected from a group consisting of N-(1-(4'-chloromethyl)phenylethoxy)-2,2,6,6-tetramethylpiperidine, 2,2,5-trimethyl-3-(1-(4'-chloromethyl)phenylethoxy)-4-phenyl-3-azahexane, and 2-bromoisobutyric bromide.

In one construction, initiating monomers that can be prepared by the above processes include, but are not limited to, 5-norbornen-2-yl 4-(1-(1-(2,2,6,6-tetramethylpiperidinoxy))ethyl)benzyl ether, 5-Norbornen-2-yl 4-(1-(3-(2,2,5-trimethyl-4-phenyl-3-azahexoxy))ethyl)benzyl ether, and 5-Norbornen-2-yl 2-bromo-2-methylpropionoate.

In one embodiment, a process for the co-polymerization of an olefin, is disclosed comprising polymerizing an olefin with an initiating monomer; and conducting said polymerizing in the presence of an metal compound, said metal compound comprising a Group 10 transition metal complex, where the complex is comprised of any combination of two neutral metal complexes, the combinations having the general formulas (I-IV):

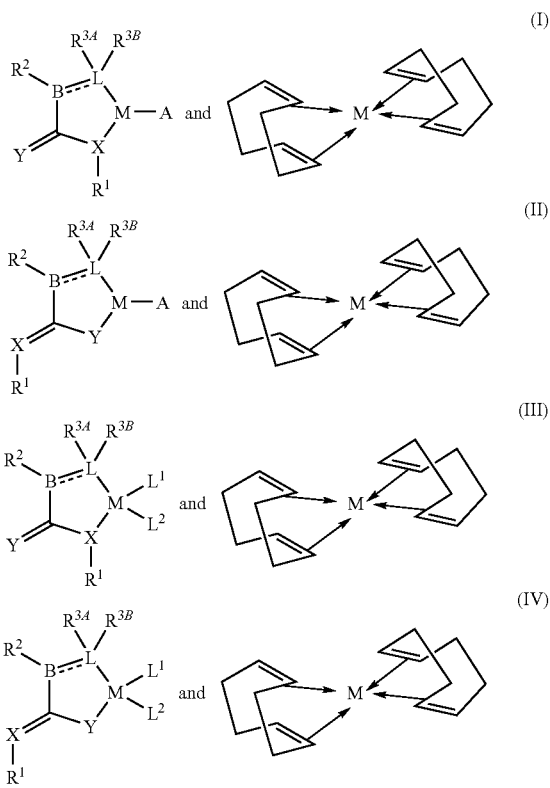

wherein:
M is a Group 10 transition metal;
A is π-allyl, substituted π-allyl, π-benzyl, or substituted π-benzyl;
X is N or P;
Y is O, $CH_2$, or S;
L is N or P or a structure that is capable of forming a neutral two electron donor ligand;
$L^1$ is a neutral monodentate ligand and $L^2$ is a monoanionic monodentate ligand, or $L^1$ and $L^2$ taken together are a monoanionic bidentate ligand, provided that said monoanionic monodentate ligand or said monoanionic bidentate ligand is capable of adding to said olefin;
B is a bridge connecting covalently an unsaturated carbon and L;
---- is a single or double bond;
$R^1$, $R^2$, $R^{3A}$ and $R^{3B}$ are the same or different and are each independently hydrogen, hydrocarbyl group, or substituted hydrocarbyl bearing functional group;
$R^{3B}$ is nothing when B is connected to L by a double bond.

In one construction, the olefin is selected from the group consisting of a compound of the formula $R^5CH=CH_2$, wherein $R^5$ is hydrogen, a hydrocarbyl group, or a substituted hydrocarbyl bearing functional group; cyclopentene; styrene; norbornene; a polar olefin; substituted cyclopentene; substituted styrene; substituted norbornene derivative having a functional group; and a combination thereof. In a more particular construction, $R^1$ and $R^3$ are (2,6-diisopropylphenyl); $R^2$ is methyl; X and L are nitrogen; Y is oxygen; B is carbon; $L^1$ is $CH_2Ph$; and $L^2$ is $PMe_3$.

In yet another construction, the metal complex comprises a combination of [N-(2,6-diisopropylphenyl)-2-(2,6-diisopropylphenylimino)propanamidato-$\kappa^2N,O$]($\eta^1$-benzyl)nickel (trimethyl phosphine) and bis(1,5-cyclooctadienyl)nickel.

The products prepared by the above co-polymerization process are random co-polymers, block co-polymers, or tapered co-polymers.

In yet another construction, the above polymerizing reaction also includes the presence of an unstabilized n-butyl acrylate so as to produce grafted tetrablock copolymers, grafted end functionalized/block copolymers, grafted random copolymers, grafted tapered copolymers, or grafted tapered tetrablock copolymers.

BRIEF DESCRIPTION OF THE DRAWINGS

For a more complete understanding of the present invention, reference is now made to the following descriptions taken in conjunction with the accompanying drawing in which.

DETAILED DESCRIPTION OF THE INVENTION

Described herein are novel monomers bearing functionalities capable of initiating control free radical reactions (herein "initiating monomers"), and a novel process using these initiating monomers for the formation of well-controlled polyethylene graft polymers where the graft component is derived from controlled free radical polymerization reactions.

All examples were performed under an inert atmosphere using standard glove box and Schlenk techniques. Solvents for syntheses like toluene, THF, hexane and pentane were distilled from benzophenone ketyl as required. All polymerization reactions were carried out in a glass reactor as described previously [5]. Toluene for polymerization runs was distilled from sodium/potassium alloy. Nickel was chosen as the transition metal for the metal complex.

L('Pr$_2$)Ni(CH$_2$Ph)(PMe$_3$) [L=N-(2,6-diisopropylphenyl)-2-(2,6-diisopropylphenylimino)propanamide] [5] and Ni(COD)$_2$ [6] were synthesized as reported and purified by re-crystallization prior to polymerization use. NMR spectra were obtained using a Varian Unity 400 or 500 spectrometers. 1H NMR and the $^{13}C$ NMR spectra of the polymers were obtained in mixed solvent ($C_6D_6$/1,2,4-trichlorobenzene 1:4 ratio in volume) at about 115° C. and ($C_6D_6$/o-dichlorobenzene about 7% v/v for polyethylene polymer and about 9% v/v for the copolymers) at about 120° C. GPC analyses were done at Mitsubishi Chemical Corporation, Japan, in o-dichlorobenzene in about 135° C.

Figure 1:
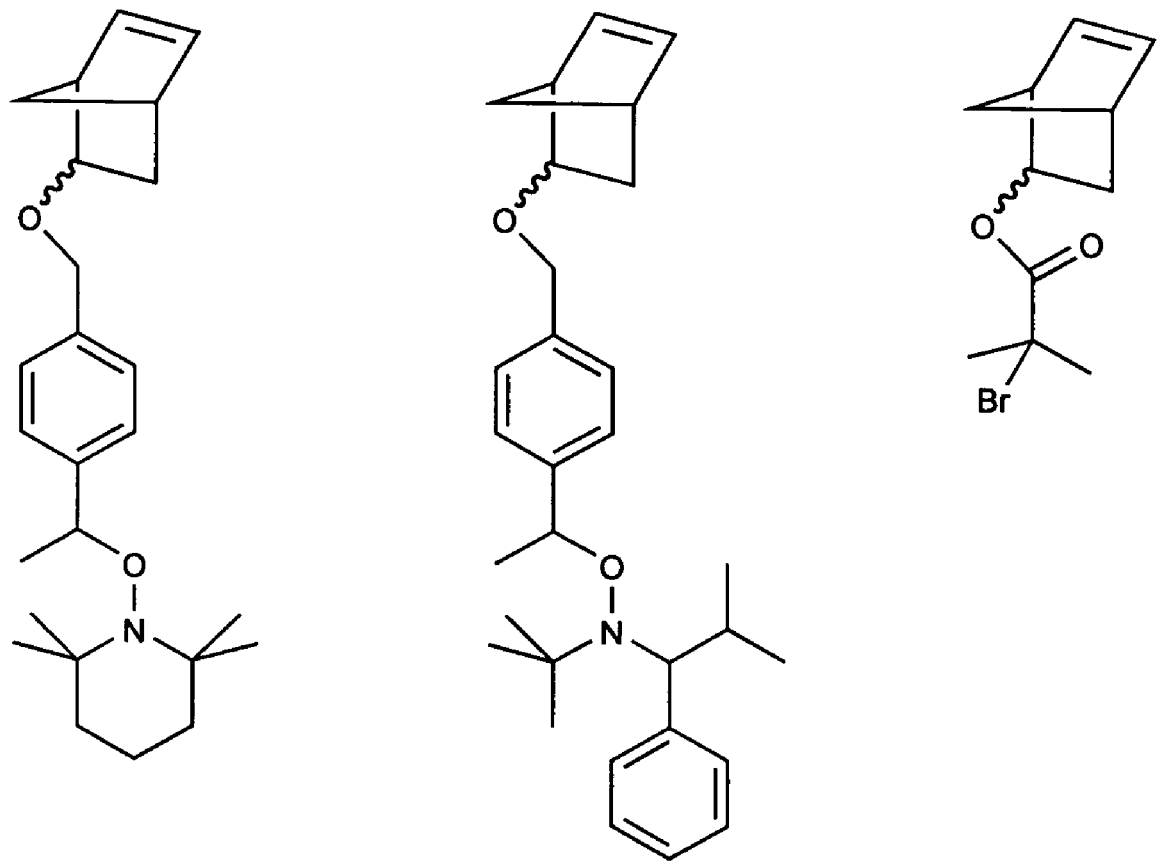
FIG. 1 shows chemical structures of some typical norbornene initiating monomers.

Initiating monomers can be formed via the nucleophilic addition of 5-norbornen-2-ol to an appropriate alkyl or acyl halide. The structures of typical norbornene monomers are shown in FIG. 1.

Substituted olefins other than 5-norbornen-2-ol that can be used to synthesize the above initiating monomers include, but are not limited to, enols, hydroxy substituted styrenes, or hydroxy substituted acrylates.

Alkyl or acyl halide that can be used to synthesize the above initiating monomers include, but are not limited to, N-(1-(4'-chloromethyl)phenylethoxy)-2,2,6,6-tetramethylpiperidine, 2,2,5-trimethyl-3-(1-(4'-chloromethyl)phenylethoxy)-4-phenyl-3-azahexane[7], and 2-bromoisobutyric bromide.

Figure 2:
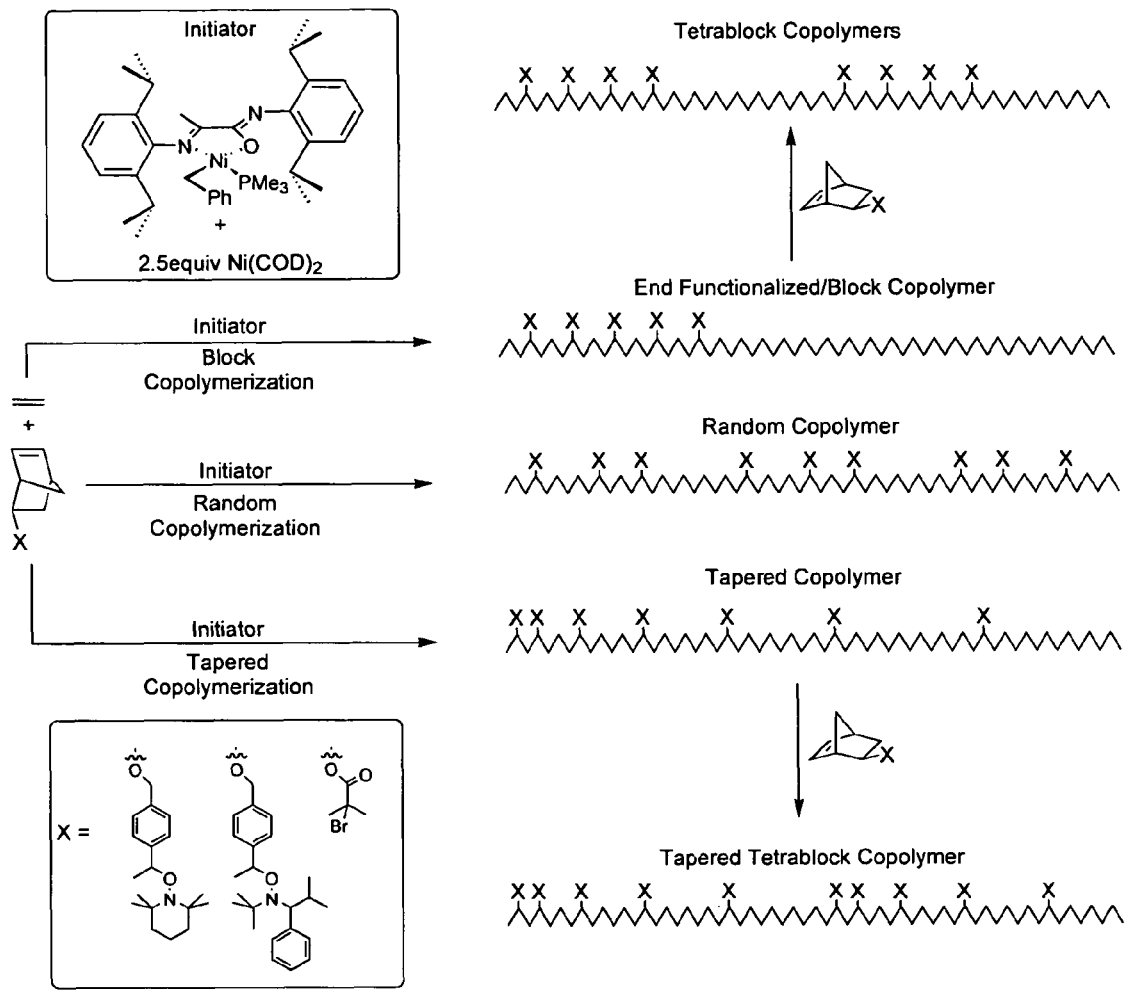
FIG. 2 shows several types of co-polymer structures that can be synthesized using the initiating monomers.

The above initiating monomers can be used to form different copolymer architectures including, but not limited to, tetrablock copolymers, end functionalized/block copolymer, random copolymers, tapered copolymers, and tapered tetrablock copolymers (see FIG. 2).

Figure 3:
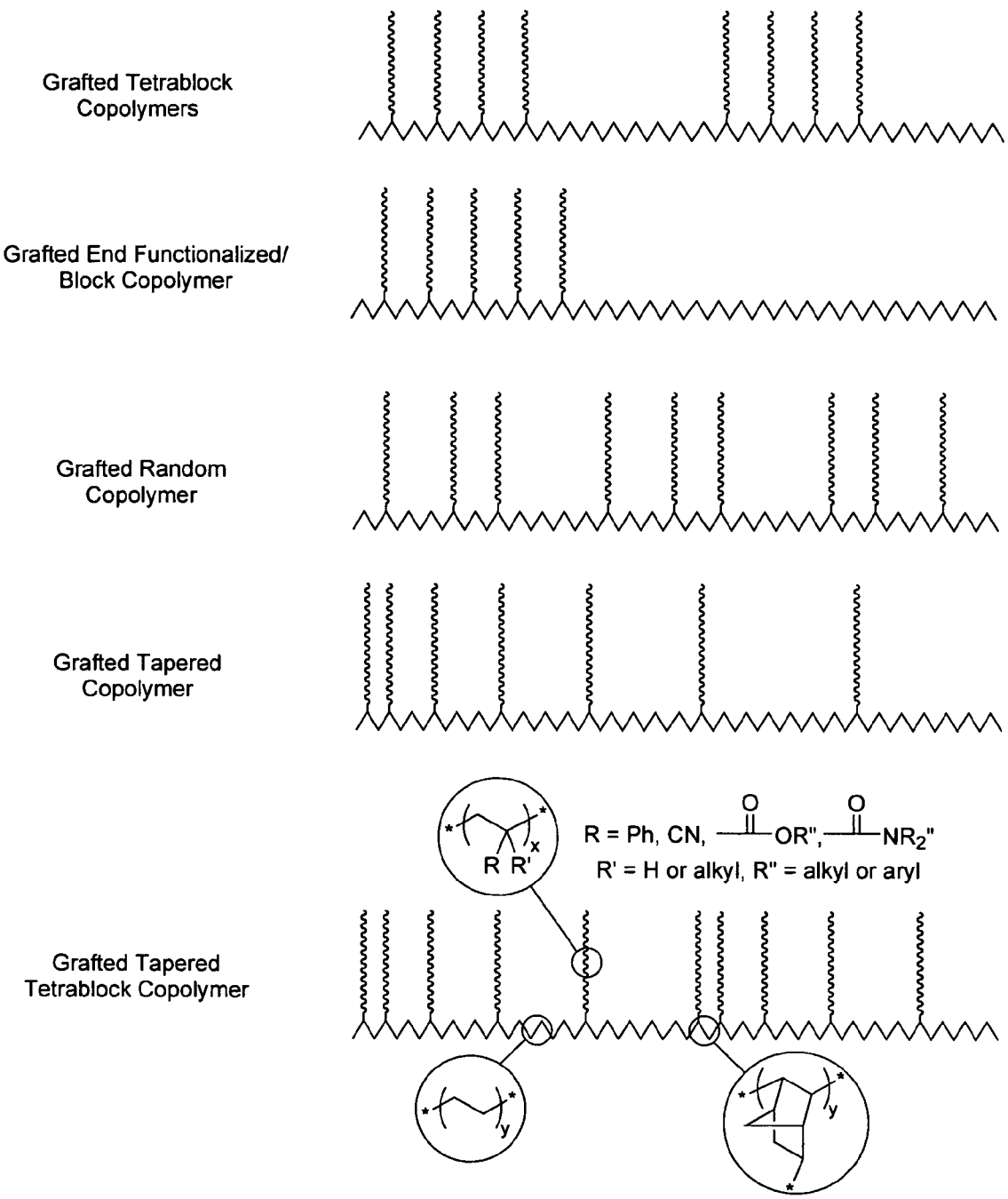
FIG. 3 shows several types of grafted co-polymer structures that can be synthesized using the initiating monomers.

In one embodiment, these initiating monomers can be used to form a variety of graft polymer structures including, but not limited, to grafted tetrablock copolymers, grafted end functionalized/block copolymers; grafted random copolymers, grafted tapered copolymers, and grafted tapered tetrablock copolymers (see FIG. 3).

The method to produce graft polymers consists first of the incorporation of controlled free radical initiator functionalized norbornenes (inimer) into polyethylene via copolymerization of the inimer with ethylene. This is accomplished by employing a functionality, tolerant and structure controlling Ni initiator system. In a second step, the resulting polymers bearing initiator functionality can then initiate polymerization resulting in graft polymers.

EXAMPLE 1

5-norbornen-2-yl 4-(1-(1-(2,2,6,6-tetramethylpiperidinoxy))ethyl)benzyl ether (Initiating Monomer 1) is synthesized according to the schematic below:

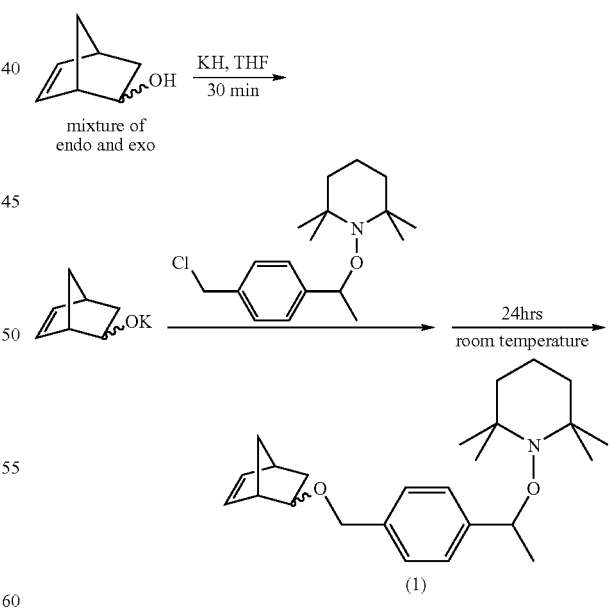

The synthesis was carried out under an inert atmosphere. To a 5-norbornen-2-ol solution (0.500 g, 4.54 mmol in 100 mL of THF) was added potassium hydride (0.188 g, 4.70 mmol) in small portions over 15 minutes with stirring. After 30 min, N-(1-(4'-chloromethyl)phenylethoxy)-2,2,6,6-tetramethylpiperidine [7] (1.27 g, 4.1 mmol in 30 mL THF) was added over 5 minutes. After stirring at room temperature for 24 hrs, the mixture was filtered through a sintered glass filter and the resultant filtrate was evaporated to dryness. The residue was redissolved in ether (250 mL) and washed with water (3×500 mL). The organic layer was then dried and the solvent removed in vacuo to give 1.45 g of crude product. The product was then purified by column chromatography using EMD™ Silica Gel 60 as the stationary phase, eluting with 40:1, then gradually increasing to 20:1 hexane/ethyl acetate to afford 1.15 g (73% yield) of pure product as a viscous pale yellow oil. $^1$H-NMR (200 MHz, CDCl$_3$, 298 K): endo isomer; δ 7.3-7.1 (m, 4H), 6.30 (m, 1 H), 6.01 (m, 1 H), 4.73 (q, 1 H), 4.43 (s, 2H), 4.18 (m, 1 H), 3.05 (m, 1 H), 2.73 (m, 1 H), 1.95 (m, 1 H), 1.60-0.70 (m, 21 H), 0.60 (br. s, 3H); exo isomer, δ 7.3-7.1 (m, 4H), 6.13 (m, 1 H), 5.86 (m, 1 H), 4.71 (q, 1 H), 4.43 (s, 2H), 3.45 (m, 1 H), 2.88 (m, 1 H), 2.73 (m, 1 H), 1.75-0.75 (m, 22H), 0.63 (br. s, 3H).

EXAMPLE 2

5-Norbornen-2-yl 4-(1-(3-(2,2,5-trimethyl-4-phenyl-3-azahexoxy))ethyl)benzyl ether (Initiating Monomer 2) is synthesized according to the schematic in below.

1.72 g of crude product. The product was then purified by column chromatography using EMD™ Silica Gel 60 as the stationary phase, eluting with 40:1, then gradually increasing to 20:1 hexane/ethyl acetate to afford 1.39 g (76% yield) of pure product as a viscous colorless oil. $^1$H-NMR (200 MHz, CDCl3, 298 K): endo isomer, δ 7.5-7.1 (m, 18H, both diastereomers), 6.35 (m, 2H, both diastereomers), 6.04 (m, 2H, both diastereomers), 4.92 (q+q, 2H, both diastereomers), 4.52 (s, 2H, diastereomers A), 4.47 (d, 2H, diastereomers B), 4.22 (m, 2H, both diastereomers), 3.42 (d, 1H, diastereomers B), 3.32 (d, 1H, diastereomers A), 3.09 (m, 2H, both diastereomers), 2.80 (m, 2H, both diastereomers), 2.35 (m, 2H, both diastereomers), 1.98 (m, 2H, both diastereomers), 1.65-0.70 (m, 38H, both diastereomers), 0.55 (d, 3H, diastereomers B), 0.22 (d, 3H, diastereomers A); exo isomer, δ 7.5-7.1 (m, 18H, both diastereomers), 6.17 (m, 2H, both diastereomers), 5.90 (m, 2H, both diastereomers), 4.89 (q+q, 2H, both diastereomers), 4.55 (s, 2H, diastereomers A), 4.49 (d, 2H, diastereomers B), 3.59 (m, 2H, both diastereomers), 3.41 (d, 1H, diastereomers B), 3.29 (d, 1H, diastereomers A), 2.93 (m, 2H, both diastereomers), 2.80 (m, 2H, both diastereomers), 2.33

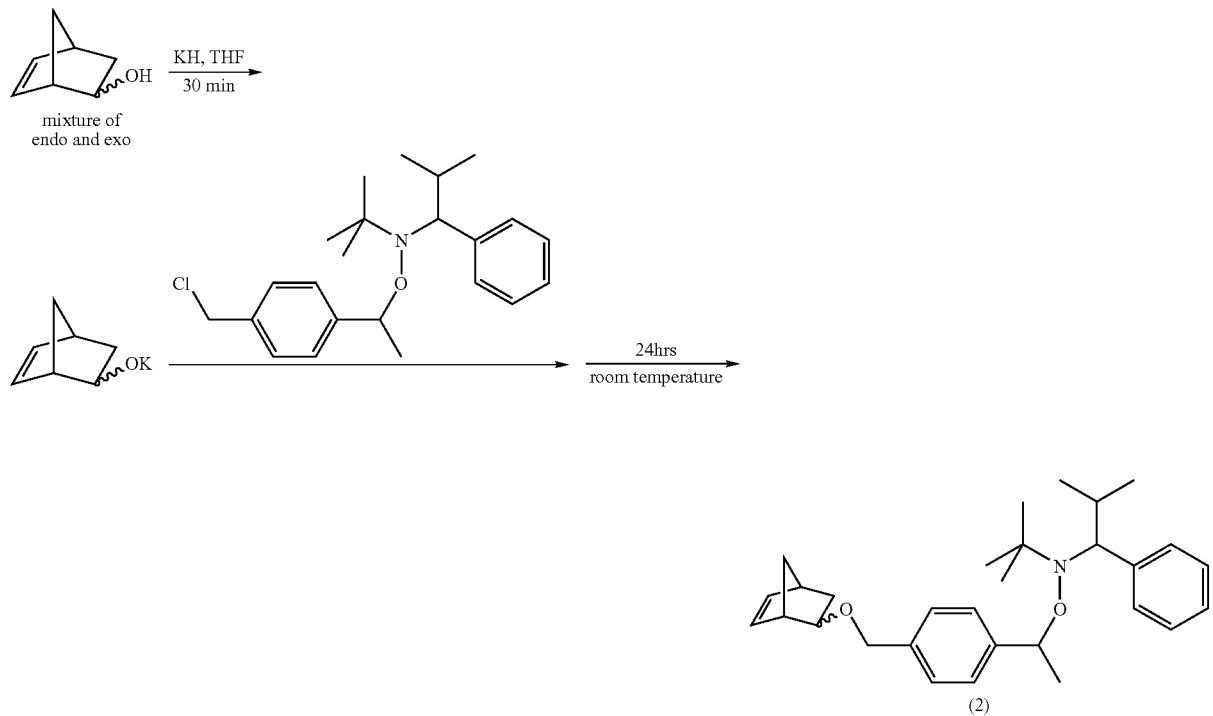

(2)

The synthesis was carried out under an inert atmosphere. To a 5-norbornen-2-ol solution (0.500 g, 4.54 mmol in 100 mL of THF) was added potassium hydride (0.188 g, 4.70 mmol) in small portions over 15 minutes with stirring. After 30 min, 2,2,5-trimethyl-3-(1-(4'-chloromethyl)phenylethoxy)-4-phenyl-3-azahexane [7] solution (1.52 g, 4.06 mmol in 30 mL THF) was added over 5 minutes. After stirring at room temperature for 24 hrs, the mixture was filtered through a sintered glass filter and the resultant filtrate was evaporated to dryness. The residue was redissolved in ether (250 mL) and washed with water (3×500 mL). The organic layer was then dried and the solvent removed in vacuo to give (m, 2H, both diastereomers), 1.80-0.70 (m, 40H, both diastereomers), 0.53 (d, 3H, diastereomers B), 0.21 (d, 3H, diastereomers A).

EXAMPLE 3

5-Norbornen-2-yl 2-bromo-2-methylpropionoate (Initiating Monomer 3) is synthesized according to the schematic below.

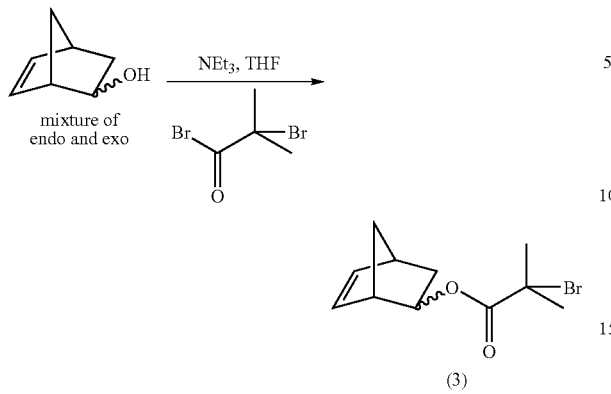

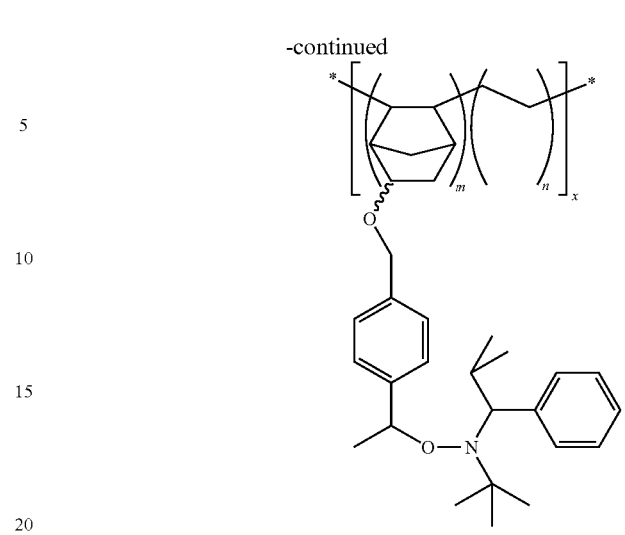

To a degassed solution of 5-norborne-2-ol (7.52 g, 68.2 mmol) and triethylamine (10.25 g, 101.3 mmol) in 400 mL THF a 2-bromoisobutyric bromide solution (20.62 g, 89.7 mmol in 50 mL THF) was added drop wise at 0° C. The reaction was left to warm slowly and stir at room temperature for 12 hrs. The reaction mixture was then filtered, and the solvent was removed in vacuo. The resultant residue was then redissolved in ether (300 mL) and washed with water (3×500 mL), saturated NaHCO$_3$ (300 mL), followed by water (500 mL). The organic layer was dried over anhydrous magnesium sulfate, and the solvents were evaporated giving 21.03 g of crude product. The product was then purified by column chromatography using EMD™ Silica Gel 60 as the stationary phase, eluting with 10:1 hexane/ethyl acetate to afford 15.9 g (90% yield) of pure product as a viscous, colorless oil. $^1$H-NMR (200 MHz, CDCl3, 298 K): endo and exo isomers; δ 6.35 (m, 1H, endo), 6.28 (m, 1H, exo), 6.05-5.95 (m, 2H, endo and exo), 5.32 (m, 1H, endo), 4.73 (m, 1H exo), 3.21 (m, 1H, endo), 2.90 (m, 1H, exo), 2.93-2.83 (m, 2H, endo and exo), 2.16 (m, 1H, endo), 1.97-1.24 (m. 8H endo, 10H exo), −0.01 (m, 1H, endo).

EXAMPLE 4

Random copolymerization of ethylene with Initiating Monomer 2 is shown as a schematic below.

Random copolymerizations were conducted in the following manner. An autoclave reactor (100 mL) was loaded inside a glove box and charged with [N-(2,6-diisopropylphenyl)-2-(2,6-diisopropylphenylimino)propanamidato-κ$^2$N,O](η$^1$-benzyl)nickel(trimethyl phosphine) (15.8 mg, 25 μmol), bis(1,5-cyclooctadienyl)nickel (27.6 mg 100 μmol), and toluene, such that the final volume of the toluene solution was 30 mL. 2.02 g of a 50 wt % solution of Initiating Monomer 2 in toluene was added to the addition funnel, such that the initial concentration would be 0.075 M upon addition of Initiating Monomer 2. The reactor was sealed inside the glove box. The reactor was attached to an ethylene line and the gas was fed continuously into the reactor through the addition funnel at 50 psi. The pressurized reaction mixture was stirred at 20+/−2° C. After 30 minutes the ethylene was vented and methanol was added to quench the polymerization. The precipitated polymer was collected by filtration and dried overnight under vacuum to yield 1.82 g. Incorporation of Initiating Monomer 2 was found to be 6 mol % by 1H NMR (200 MHz, CDCl$_3$, 25° C.) $M_n$=27,402 g/mol, $M_w$=47,508 g/mol, PDI=1.72 as calculated by Refractive Index GPC Analysis (o-dichlorobenzene, 135° C.) relative to polyethylene universal calibration from polystyrene standards.

EXAMPLE 5

Block copolymerizations of ethylene and Initiating Monomer 2 were performed accordingly to the scheme below.

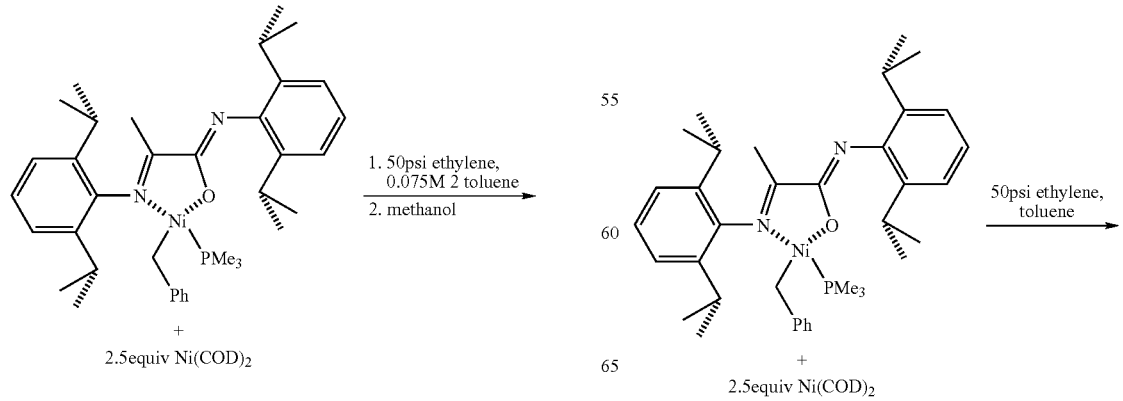

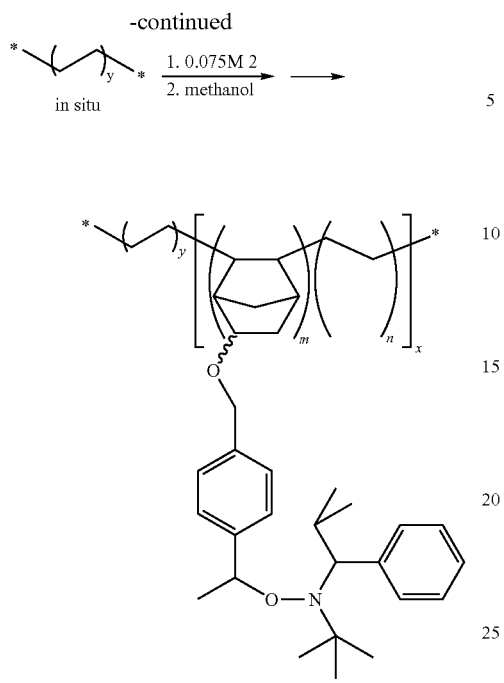

An autoclave reactor (100 mL) was loaded inside a glovebox and charged with [N-(2,6-Diisopropylphenyl)-2-(2,6-diisopropylphenylimino)propanamidato-κ²N,O](η¹-benzyl)nickel(trimethyl phosphine) (15.8 mg, 25 μmol), bis(1,5-cyclooctadienyl)nickel (27.6 mg 100 μmol), and toluene, such that the final volume of the toluene solution was 30 mL. 2.02 9 of a 50 wt % solution of Initiating Monomer 2 in toluene was added to the addition funnel, such that the initial concentration would be 0.075 M upon addition of Initiating Monomer 2. The reactor was sealed inside the glovebox. The reactor was attached to an ethylene line and the gas was fed continuously into the reactor at 100 psi while maintaining a constant temperature of 20+/−2° C. After 13 minutes, the ethylene was line was connected to the addition funnel and the pressure was ramped to 120 psi to begin a block of copolymer. After 2 minutes of copolymerization the ethylene was vented and methanol was added to quench the polymerization. The precipitated polymer was collected by filtration and dried overnight under vacuum to yield 2.50 g. Incorporation of Initiating Monomer 2 was under the detectable limit of 0.2 mol % by ¹H NMR (C₆D₆/1,2,4-trichlorobenzene, 115° C.) $M_n$=56,754 g/mol, $M_w$=90,169 g/mol, PDI=1.55 as calculated by Refractive Index GPC Analysis (o-dichlorobenzene, 135° C.) relative to polyethylene universal calibration from polystyrene standards. $T_m$=127° C. as determined by DSC.

EXAMPLE 6

Grafting of poly(n-butylacrylate) chains to poly[ethylene-b-(ethylene-co-2) was performed accordingly to the schematic below.

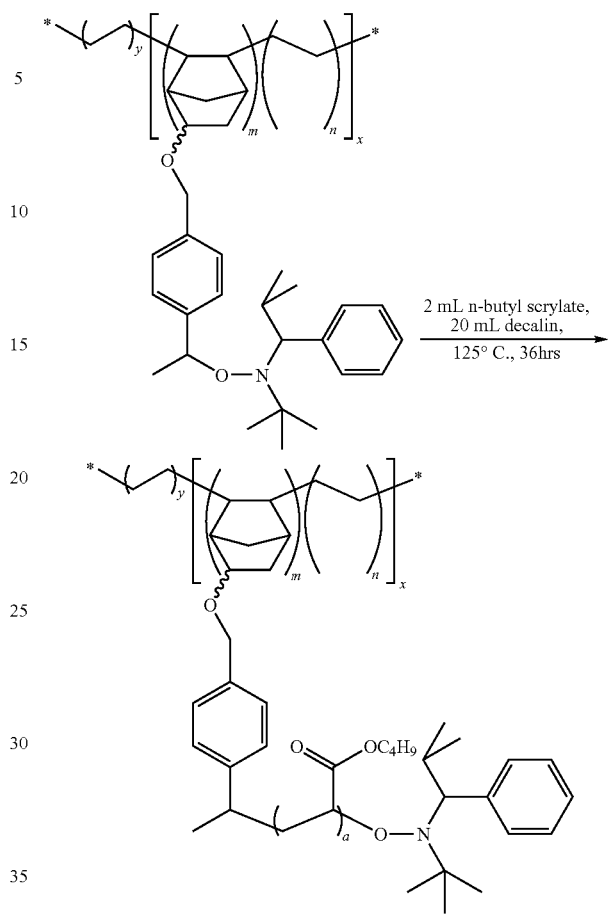

A round bottom flask was charged with 150 mg of block copolymer, 2 mL unstabilized n-butyl acrylate, 20 mL decalin and degassed with argon for 20 minutes. Under an argon flow the contents of the round bottom were stirred and heated to 125° C. After 36 hours at 125° C. the contents of the flask were poured into a beaker containing 200 mL of methanol to precipitate the polymer. The polymer was collected on a filter paper and dried in vacuo at 50° C. Purification by Soxhlet extraction using dichloromethane as the extracting solvent removes the low molecular weight impurities from the polymer mixture leaving only high molecular weight polymer. $T_m$=127° C. as determined by DSC.

Figure 4:
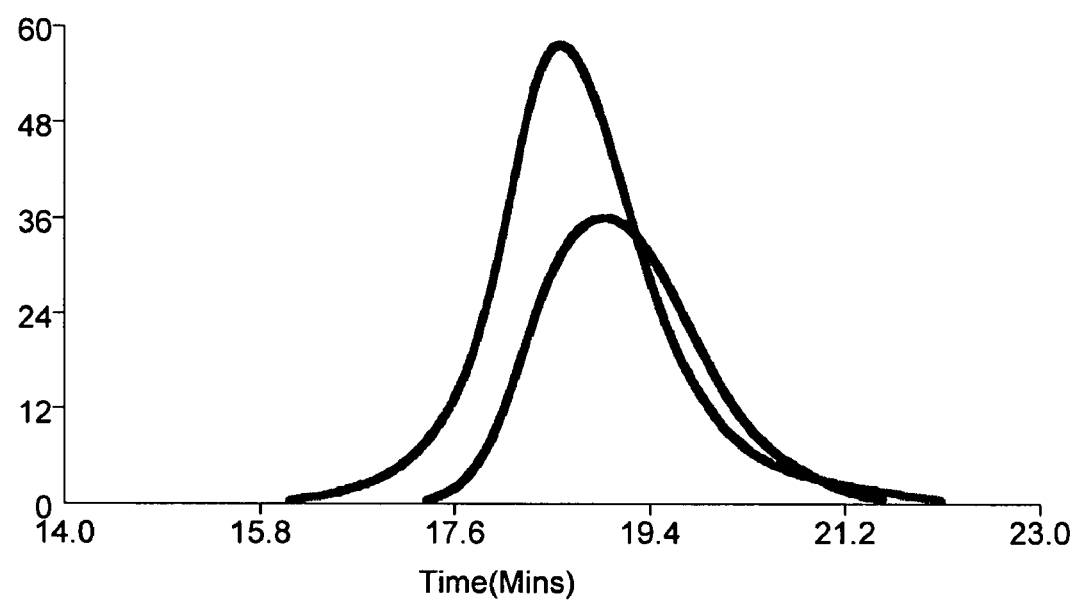
FIG. 4 shows a gel permeation chromatograph overlay graph.

Gel Permeation Chromatograph Overlay of Polymer from Example 5 and Polymer from Example 6 is shown in FIG. 4. Example 5 (gray), $M_n$=56,754 g/mol, $M_w$=90,169 g/mol, PDI=1.55, and Example 6 (black), $M_n$=77,025 g/mol, $M_w$=138,749 g/mol, PDI=1.80 as calculated by Refractive Index GPC Analysis (o-dichlorobenzene, 135° C.) relative to polyethylene universal calibration from polystyrene standards.

REFERENCES

The following publications are hereby incorporated by reference:

1. Chung, T. C. *Prog. Polym. Sci.* 2002, 27, 39
2. Ittel, S. D.; Johnson, L. K.; Brookhart, M. *Chem. Rev.* 2000, 100, 1169

3. Bazan, G. C.; Ghosh, P.; Shimizu, F. U.S. Pat. No. 4,024, 149, Feb. 28, 2003
4. Yasuda, H.; Ihara, E.; Morimoto, M.; Yamashita, M.; Nodono, M.; Yoshioka, S. *Polymer Preprints* 1994, 35, 532
5. Lee, B. Y.; Bazan, G. C.; Vela, J.; Komon, Z. J. A.; Bu, X. *J. Am. Chem. Soc.* 2001, 123, 5352.
6. Schunn, R. A.; Ittel, S. D.; Cushing, M. A. Inorg. Synth. 1990, 28, 94.
7. Bothe, M.; Schmidt-Naake, G. *Macromol. Rapid Commun.* 2003, 24, 609

Although the present invention has been described in connection with the preferred embodiments, it is to be understood that modifications and variations may be utilized without departing from the principles and scope of the invention, as those skilled in the art will readily understand. Accordingly, such modifications may be practiced within the scope of the following claims.

The invention claimed is:

1. A process for the co-polymerization of an olefin, comprising:
   a. polymerizing an olefin with an initiating monomer; and
   b. conducting said polymerizing in the presence of a metal compound, said metal compound comprising a Group 10 transition metal complex, said complex comprising any combination of two neutral metal complexes, the combinations having one of the general formulas (I-IV):

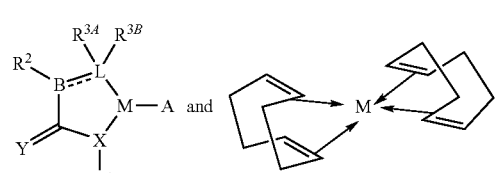

wherein:
   M is a Group 10 transition metal;
   A is π-allyl, substituted π-allyl, π-benzyl, or substituted π-benzyl;
   X is N or P;
   Y is O, $CH_2$, or S;
   L is N or P or a structure that is capable of forming a neutral two electron donor ligand;
   $L^1$ is a neutral monodentate ligand and $L^2$ is a monoanionic monodentate ligand, or $L^1$ and $L^2$ taken together are a monoanionic bidentate ligand, provided that said monoanionic monodentate ligand or said monoanionic bidentate ligand is capable of adding to said olefin;
   B is a bridge connecting covalently an unsaturated carbon and L;
   ---- is a single or double bond;
   $R^1$, $R^2$, $R^{3A}$ and $R^{3B}$ are the same or different and are each independently hydrogen, hydrocarbyl group, or substituted hydrocarbyl bearing functional group;
   $R^{3B}$ is nothing when B is connected to L by a double bond.

2. The method of claim 1, wherein the olefin is selected from the group consisting of a compound of the formula $R^5CH=CH_2$, wherein $R^5$ is hydrogen, a hydrocarbyl group, or a substituted hydrocarbyl bearing functional group; cyclopentene; styrene; norbornene; a polar olefin; substituted cyclopentene; substituted styrene; substituted norbornene derivative having a functional group; and a combination thereof.

3. The process of claim 1, wherein $R^1$ and $R^{3A}$ are (2,6 diisopropylphenyl); $R^2$ is methyl; X and L are nitrogen; Y is oxygen; B is carbon; $L^2$ is $CH_2Ph$; and $L^1$ is $PMe_3$.

4. The process of claim 1, wherein M is nickel.

5. The process of claim 1, wherein said metal complex comprises a combination of [N-(2,6-diisopropylphenyl)-2-(2,6-diisopropylphenylimino)propanamidato-$\kappa^2$N, O]($\eta^1$-benzyl)nickel(trimethyl phosphine) and bis(1,5-cyclooctadienyl)nickel.

6. The process of claim 1, wherein said initiating monomer is a compound selected from the group consisting of 5-norbornen-2-yl 4-(1-(1-(2,2,6,6-tetramethylpiperidinoxy))ethyl)benzyl ether, 5-Norbornen-2-yl 4-(1-(3-(2,2,5-trimethyl-4-phenyl-3-azahexoxy))ethyl)benzyl ether, and 5-Norbornen-2yl 2-bromo-2-methylpropionate.

7. A process for the co-polymerization of an olefin to produce grafted co-polymers, comprising:
   a. polymerizing an olefin with an initiating monomer;
   b. conducting said polymerizing in the presence of a metal compound, said metal compound comprising a Group 10 transition metal complex, said complex comprising any combination of two neutral metal complexes, the combination having one of the general formulas (I-IV):

-continued

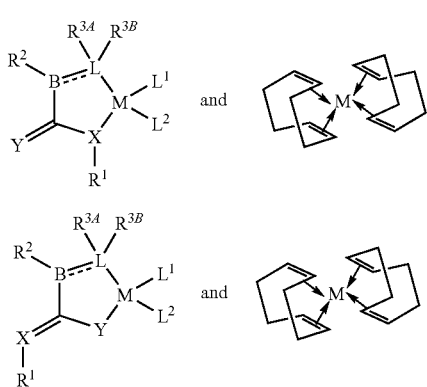

(III)

and (IV)

wherein:
M is a Group 10 transition metal;
A is π-allyl, substituted π-allyl, π-benzyl, or substituted π-benzyl;
X is N or P;
Y is O, CH$_2$, or S;
L is N or P or a structure that is capable of forming a neutral two electron donor ligand;
L$^1$ is a neutral monodentate ligand and L$^2$ is a monoanionic monodentate ligand, or L$^1$ and L$^2$ taken together are a monoanionic bidentate ligand, provided that said monoanionic monodentate ligand or said monoanionic bidentate ligand is capable of adding to said olefin;
B is a bridge connecting covalently an unsaturated carbon and L;
---- is a single or double bond;
R$^1$, R$^2$, R$^{3A}$ and R$^{3B}$ are the same or different and are each independently hydrogen, hydrocarbyl group, or substituted hydrocarbyl bearing functional group;
R$^{3B}$ is nothing when B is connected to L by a double bond, and
c. conducting said polymerizing in the presence of an unstabilized n-butyl acrylate.

8. The process of claim 1, wherein the initiating monomer is prepared by
a. combining an amount of 5-norbornen-2-ol with a hydride or amine for a predetermined amount of time to form a mixture; and
b. adding an amount of an alkyl or acyl halide to said mixture.

* * * * *